United States Patent
Han et al.

(10) Patent No.: US 9,420,591 B2
(45) Date of Patent: Aug. 16, 2016

(54) METHOD AND APPARATUS FOR RECONFIGURING CONTROL CHANNEL IN WIRELESS COMMUNICATION SYSTEM

(75) Inventors: Jung-Su Han, Yongin-si (KR); Hi-Chan Moon, Yongin-si (KR); Jun-Sung Lim, Seoul (KR); Jin-Ho Kim, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1021 days.

(21) Appl. No.: 13/098,670

(22) Filed: May 2, 2011

(65) Prior Publication Data

US 2011/0269442 A1  Nov. 3, 2011

(30) Foreign Application Priority Data

May 3, 2010 (KR) ................. 10-2010-0041608

(51) Int. Cl.
| | |
|---|---|
| *H04J 4/00* | (2006.01) |
| *H04L 5/00* | (2006.01) |
| *H04W 72/08* | (2009.01) |
| *H04W 16/14* | (2009.01) |

(52) U.S. Cl.
CPC ........... *H04W 72/082* (2013.01); *H04L 5/0096* (2013.01); *H04L 5/001* (2013.01); *H04L 5/0053* (2013.01); *H04W 16/14* (2013.01)

(58) Field of Classification Search
CPC ............................. H04L 5/001; H04L 5/0053
USPC ................................................. 370/436, 437
See application file for complete search history.

(56) References Cited

U.S. PATENT DOCUMENTS

| | | | |
|---|---|---|---|
| 7,353,039 B2* | 4/2008 | Czaja et al. .................... 455/522 |
| 7,902,516 B2* | 3/2011 | Friedman .................. G01T 1/18 |
| | | | 250/385.1 |
| 7,920,516 B2* | 4/2011 | Nishio et al. .................. 370/328 |
| 8,005,039 B2* | 8/2011 | Kamuf et al. ................. 370/328 |
| 8,514,793 B2* | 8/2013 | Gauvreau et al. ............. 370/329 |
| 2001/0044261 A1* | 11/2001 | Elledge .......................... 451/41 |
| 2004/0106412 A1* | 6/2004 | Laroia ................... H04W 16/12 |
| | | | 455/448 |
| 2006/0142051 A1* | 6/2006 | Purnadi ............. H04W 72/0453 |
| | | | 455/552.1 |
| 2007/0054682 A1* | 3/2007 | Fanning .............. H04L 27/2608 |
| | | | 455/509 |

(Continued)

FOREIGN PATENT DOCUMENTS

| | | |
|---|---|---|
| EP | 2 077 646 A1 | 7/2009 |
| EP | 2 161 864 A1 | 3/2010 |

(Continued)

OTHER PUBLICATIONS

"Change Request", 3GPP TSG-RAN3 Meeting #63, R3-090560, Feb. 9, 2012, Athens, Greece.

(Continued)

*Primary Examiner* — Marcus R Smith
*Assistant Examiner* — Dewanda Samuel
(74) *Attorney, Agent, or Firm* — Jefferson IP Law, LLP

(57) ABSTRACT

A method for receiving control information by a User Equipment (UE) in a wireless communication system is provided. The method includes monitoring channel quality of a control channel, determining whether reconfiguration of the control channel is needed, based on the channel quality of the control channel, if the reconfiguration of the control channel is needed, requesting an evolved Node B (eNB) to reconfigure the control channel, and receiving the control information through the reconfigured control channel.

20 Claims, 15 Drawing Sheets

(56) References Cited

U.S. PATENT DOCUMENTS

| | | | |
|---|---|---|---|
| 2008/0014951 A1* | 1/2008 | Laroia et al. | 455/450 |
| 2009/0088148 A1* | 4/2009 | Chung et al. | 455/423 |
| 2009/0238121 A1 | 9/2009 | Kotecha | |
| 2010/0087202 A1* | 4/2010 | Ventola et al. | 455/452.1 |
| 2010/0118746 A1* | 5/2010 | Gerlach | H04W 72/1289 370/281 |
| 2010/0150007 A1 | 6/2010 | Jung et al. | |
| 2010/0234037 A1* | 9/2010 | Terry et al. | 455/450 |
| 2010/0254268 A1* | 10/2010 | Kim et al. | 370/241 |
| 2010/0254351 A1* | 10/2010 | Wang et al. | 370/332 |
| 2010/0303011 A1* | 12/2010 | Pan et al. | 370/328 |
| 2010/0322158 A1* | 12/2010 | Lee et al. | 370/329 |
| 2011/0038275 A1 | 2/2011 | Kim et al. | |
| 2011/0044259 A1* | 2/2011 | Nimbalker et al. | 370/329 |
| 2011/0103243 A1* | 5/2011 | Larsson | H04L 5/001 370/252 |
| 2011/0110296 A1* | 5/2011 | Malladi et al. | 370/328 |
| 2011/0170496 A1* | 7/2011 | Fong et al. | 370/329 |
| 2012/0182958 A1* | 7/2012 | Pelletier | H04L 5/001 370/329 |

FOREIGN PATENT DOCUMENTS

| | | |
|---|---|---|
| KR | 10-2008-0039262 A | 5/2008 |
| KR | 10-2011-0106215 A | 9/2011 |
| WO | 2008/054099 A1 | 5/2008 |
| WO | 2009/116816 A2 | 9/2009 |

OTHER PUBLICATIONS

LG Electronics, "Component Carrier Indication by PDCCH for Multiple Carrier Aggregation in LTE-Advanced", 3GPP TSG RAN WG1 #57bis, R1-092500, Jun. 29, 2009, Los Angeles, USA.

* cited by examiner

METHOD AND APPARATUS FOR RECONFIGURING CONTROL CHANNEL IN WIRELESS COMMUNICATION SYSTEM

PRIORITY

This application claims the benefit under 35 U.S.C. §119(a) of a Korean patent application filed in the Korean Intellectual Property Office on May 3, 2010 and assigned Serial No. 10-2010-0041608, the entire disclosure of which is hereby incorporated by reference.

BACKGROUND OF THE INVENTION

1. Field of the Invention

The present invention relates to a method and an apparatus for configuring a control channel in a wireless communication system. More particularly, the present invention relates to a method and an apparatus for reconfiguring a control channel considering the effects of interference.

2. Description of the Related Art

Next-generation communication systems have evolved into mobile communication systems that provide User Equipments (UEs) with services capable of high-speed, high-capacity data transmission.

The recent increase in demand for data services may hardly be met by the cell splitting technology of the related art. Therefore, the next-generation mobile communication systems, such as Long Term Evolution (LTE) and LTE-Advanced (LTE-A), have been proposed for servicing small indoor/outdoor areas using micro evolved Node Bs (eNBs) having cell coverage areas smaller than that of macro eNBs. The micro eNB may refer to all types of cells, including a femto cell, a pico cell, a relay node, a radio repeater, and the like. Compared with a network of macro cells, a network of micro cells is considered a heterogeneous network capable of increasing the capacity with low cost, and the heterogeneous network is one of the major evolutionary technologies under discussion in the next-generation mobile communication systems.

However, the heterogeneous network may suffer from many problems, such as cell identification difficulty due to the lack of cell Identifiers (IDs), and coverage area imbalance between an uplink and a downlink because of the different transmission powers of cells. More particularly, the interference problem between heterogeneous cells, such as interference between macro cells and micro cells, is one of the most significant problems the heterogeneous network now faces.

FIG. 1 is a diagram illustrating an interference problem between heterogeneous cells according to the related art. An interference problem between a macro cell and micro cells will be described with reference to FIG. 1.

Referring to FIG. 1, interference problems in a heterogeneous network may be roughly divided into two types. For example, an eNB and a UE of a macro cell 110 will be referred to as a macro eNB 111 and a macro UE 113, respectively, while eNBs and UEs of micro cells will be referred to as micro eNBs 131 and 151, and a micro UE 153, respectively.

For example, as for one of the interference problems, the micro UE 153 connected to the micro eNB 151 forming a pico cell 150 may be affected by transmission signals of the macro eNB 111. The macro eNB 111 is far greater than the micro eNB 151 in terms of transmission power, so the macro eNB 111 has a coverage area broader than that of the micro eNB 151. In this case, the micro UE 153 connected to the micro eNB 151 may be affected significantly by the signals received from the macro cell 110.

As for the other interference problem, the macro UE 113 connected to the macro eNB 111 may be affected by transmission signals of the micro eNB 131 forming a femto cell. A cell 130 of the micro eNB 131 may be a Closed Subscriber Group (CSG) cell like a femto cell. In this case, the macro UE 113 may be affected by the signals transmitted from the micro eNB 131 because the macro UE 113 cannot access the micro eNB 131 even though it is located close to the micro eNB 131.

As described above, a macro UE connected to a macro cell may be affected by signals from a micro cell, while a micro UE connected to a micro cell may be affected by signals from a macro cell. This interference problem may interfere especially with the stable reception of a control channel. In the LTE-A system, introduction of an Extended-Physical Downlink Control Channel (E-PDCCH) has been proposed to address the interference problem in a control channel region, such as a PDCCH.

FIG. 2 illustrates control channel reconfiguration from a PDCCH to an E-PDCCH according to the related art.

Referring to FIG. 2, reference numeral 210 represents a PDCCH region for transmission of downlink control information, and reference numeral 230 represents a Physical Downlink Shared Channel (PDSCH) region for transmission of downlink data. The LTE-A system may allocate control information for a UE to an E-PDCCH region 231 in the PDSCH region 230, for its transmission in the heterogeneous network environment. In order for the E-PDCCH to be supportable in the PDSCH region 230, effective reconfiguration of a control channel from the existing PDCCH region 210 to the E-PDCCH region 231 is required. The need for the reconfiguration process from the PDCCH region 210 to the E-PDCCH region 231 arises even in a PDCCH reconfiguration process between Carrier Components (CCs) of a carrier aggregation scheme, which is another technology presently proposed as the major technology in the next-generation communication system like the LTE-A system.

FIG. 3 illustrates inter-CC PDCCH reconfiguration in carrier aggregation according to the related art.

Referring to FIG. 3, when a UE using a CC1 PDCCH region 301 desires to move its CC to a CC2 PDCCH region 303, a reconfiguration process for a control channel from the CC1 PDCCH region 301 to the CC2 PDCCH region 303 is required.

Many studies have been conducted to reconfigure a control channel considering the interference problems in the control channel region. This control channel reconfiguration is more required to cope with interference between heterogeneous cells, like interference between a macro cell and a micro cell. For the control channel reconfiguration, an efficient signaling procedure is required between a UE and an eNB.

Therefore, a need exists for a method and an apparatus for efficiently performing control channel reconfiguration in a wireless communication system.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for efficiently performing control channel reconfiguration in a wireless communication system.

Another aspect of the present invention is to provide a method and an apparatus for reconfiguring a control channel in a wireless communication system where heterogeneous cells coexist.

Another aspect of the present invention is to provide a method and an apparatus for allowing a User Equipment (UE) to identify a time of control channel reconfiguration, if any, in a wireless communication system.

In accordance with an aspect of the present invention, a method for receiving control information by a UE in a wireless communication system is provided. The method includes monitoring channel quality of a control channel, determining whether reconfiguration of the control channel is needed, based on the channel quality of the control channel, if the reconfiguration of the control channel is needed, requesting an evolved Node B (eNB) to reconfigure the control channel, and receiving the control information through the reconfigured control channel.

In accordance with another aspect of the present invention, a UE for receiving control information in a wireless communication system is provided. The UE includes a transmission/reception unit for receiving control information from an eNB, and for transmitting and receiving a message associated with reconfiguration of a control channel carrying the control information, and a controller for monitoring channel quality of the control channel, for determining whether reconfiguration of the control channel is needed, based on the channel quality of the control channel, for requesting the eNB to reconfigure the control channel if the reconfiguration of the control channel is needed, and for receiving the control information through the reconfigured control channel.

In accordance with another aspect of the present invention, a method for transmitting control information by an eNB in a wireless communication system is provided. The method includes determining whether a message requesting reconfiguration of a control channel has been received from a UE, upon receiving the message, allocating a reconfigured control channel to a region of an extended control channel in a data channel, and transmitting the control information through the reconfigured control channel.

In accordance with another aspect of the present invention, an eNB for transmitting control information in a wireless communication system is provided. The eNB includes a transmission/reception unit for transmitting control information to a UE, and for transmitting and receiving a message associated with reconfiguration of a control channel carrying the control information, and a controller for determining whether a message requesting reconfiguration of the control channel has been received from the UE, for allocating a reconfigured control channel to a region of an extended control channel in a data channel upon receiving the message, and for transmitting the control information through the reconfigured control channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method and an apparatus for efficiently performing control channel reconfiguration in a wireless communication system.

Although a control channel reconfiguration procedure in a Long Term Evolution (LTE) and LTE-Advanced (LTE-A) system will be considered herein for convenience of description, exemplary embodiments of the present invention may be applied in substantially the same way in any wireless communication systems where the control channel reconfiguration is performed. Therefore, it should be noted that the present invention is not limited to the LTE-A or LTE system.

Figure 1:
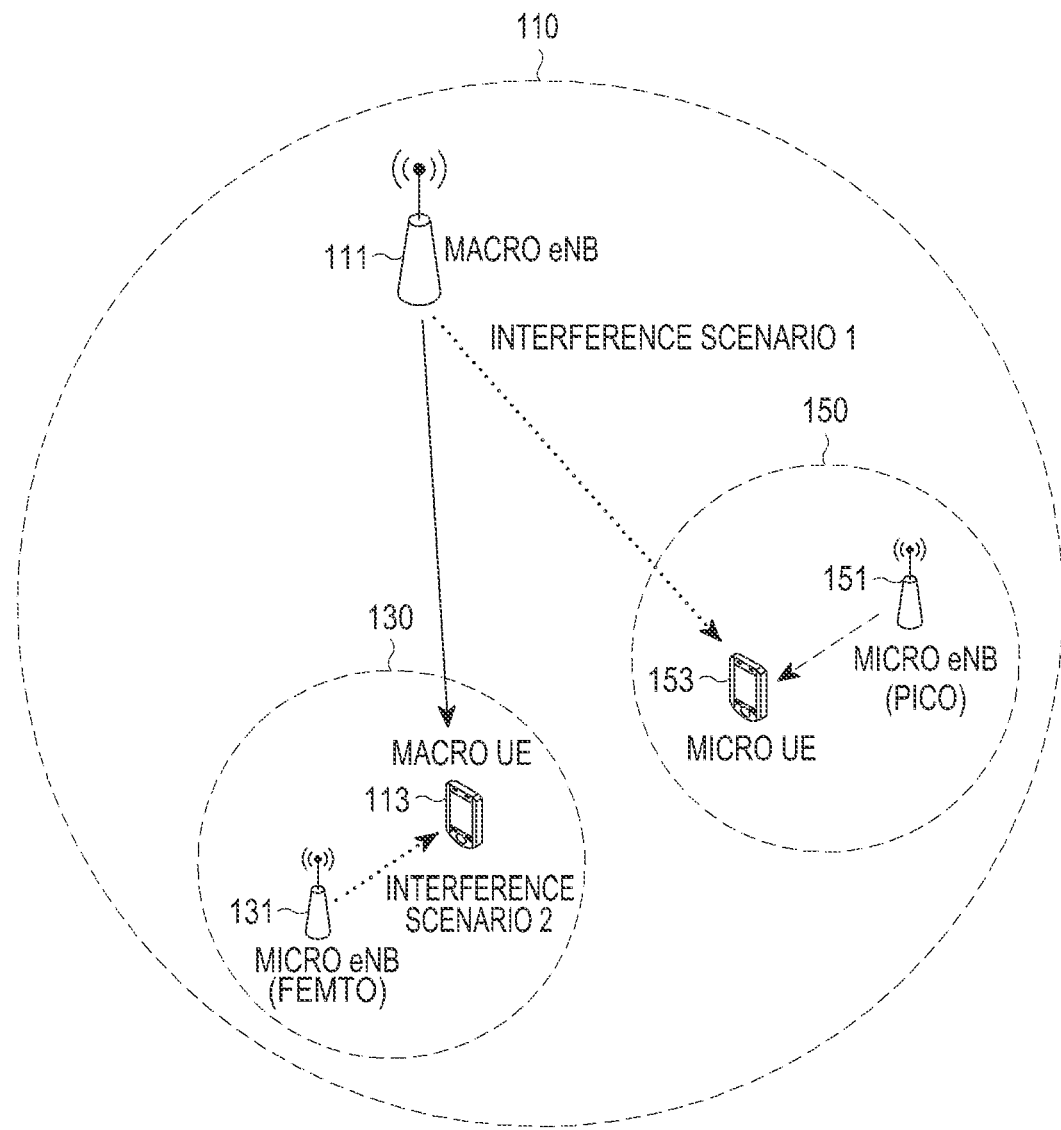
FIG. 1 is a diagram illustrating an interference problem between heterogeneous cells according to the related art.
Figure 2:
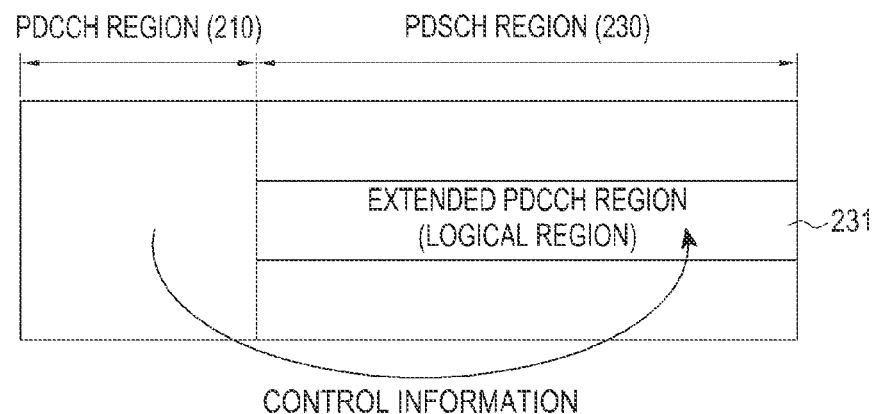
FIG. 2 is a diagram illustrating control channel reconfiguration from a Physical Downlink Control Channel (PDCCH) to an Extended-PDCCH (E-PDCCH) according to the related art.
Figure 3:
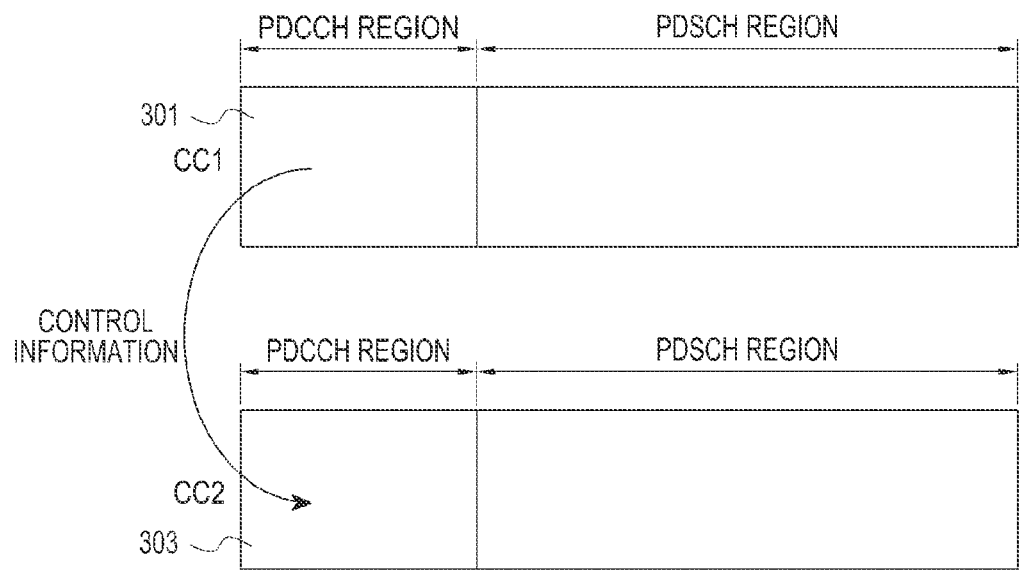
FIG. 3 is a diagram illustrating inter-Carrier Component (CC) PDCCH reconfiguration in carrier aggregation according to the related art.

An exemplary embodiment of the present invention, described below, proposes a method of efficiently performing control channel reconfiguration from the existing control channel region (e.g., Physical Downlink Control Channel (PDCCH) region) to a new control channel region (e.g., an Extended-PDCCH (E-PDCCH) region described in FIG. 2, or a PDCCH region of another Carrier Component (CC) described in FIG. 3) due to interference in a wireless communication system. This control channel reconfiguration may be applied to control channel reconfiguration in the heterogeneous network where for example, macro cells and micro cells coexist. The control channel reconfiguration method may be applied in the same way not only in the heterogeneous network but also in the homogenous network.

FIGS. 4 through 16, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 4A:
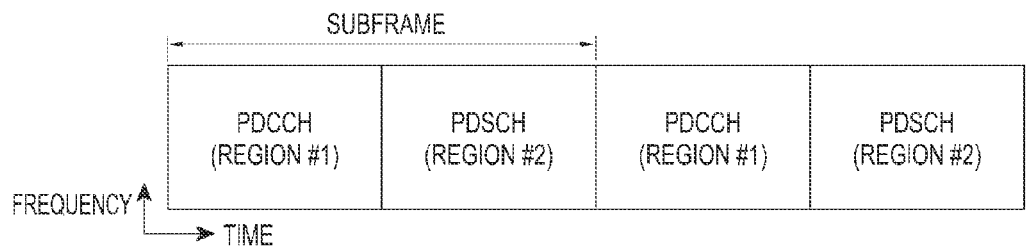
FIGS. 4A through 4C are diagrams illustrating structures of wireless resources in a wireless communication system according to exemplary embodiments of the present invention.
Figure 4B:
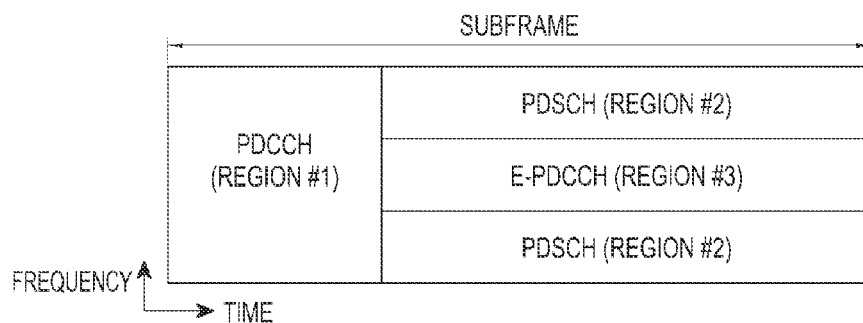
Figure 4C:
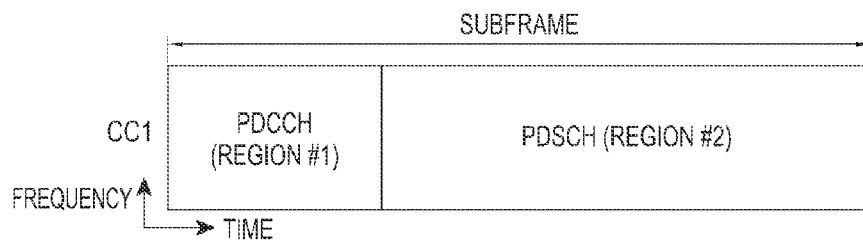
Figure 4C:
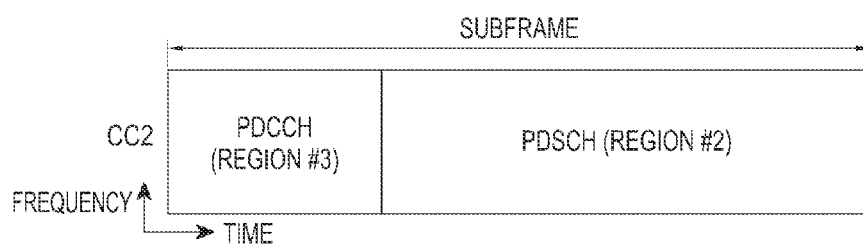

FIGS. 4A through 4C illustrate structures of wireless resources in a wireless communication system according to exemplary embodiments of the present invention.

Referring to FIG. 4A, a wireless resource is divided into subframes, and each subframe may be divided into several resource regions, such as a control channel region (e.g., a PDCCH) and a data channel region (e.g., Physical Downlink Shared Channel (PDSCH)).

For convenience of description, among the regions where wireless resource is allocated, a region for transmission of control information will be referred to as a first region, a region for transmission of data will be referred to as a second region, and a region where control information is transmitted after control channel reconfiguration is completed, will be referred to as a third region. Due to the control channel reconfiguration from the first region to the third region, the control information, which was transmitted in the first region, will be transmitted in the third region.

The entire resource region may be divided into a PDCCH region (including a first region (or Region #1) and a third region (Region #3)) for transmission of control information and a PDSCH region (including a second region (Region #2)) for transmission data.

Referring to FIG. 4B, an E-PDCCH region carrying a control channel exists as a third region in the PDSCH region or the second region in the heterogeneous network. The E-PDCCH is a subset of a PDSCH. The E-PDCCH may be multiplexed with the PDSCH not only by Frequency Division Multiplexing (FDM) but also by Time Division Multiplexing (TDM) or TDM+FDM, for its transmission.

Referring to FIG. 4C, due to a control channel reconfiguration, the control information, which was transmitted in a first region CC1, may be transmitted in a third region CC2.

For the control channel reconfiguration, a User Equipment (UE) determines whether it should receive control information not from the first region but from the third region by monitoring the first region or the existing PDCCH region, and if it needs to receive the control information from the third region, the UE reports an evolved Node B (eNB) that it needs to allocate control information in the third region. In this case, if the UE determines that the channel state meets or does not meet a reference predefined in the system for channel control reconfiguration or a reference determined by the eNB, then the UE reports to the eNB about this, and the eNB changes a control channel allocation mode, such as allocating a control channel to another region. The UE may also change its operation mode according thereto.

For the control channel reconfiguration, the UE may monitor the first region in various different ways according to the systems.

In an exemplary embodiment of the present invention, a UE may monitor a first region using the following exemplary implementations. In an exemplary implementation, a UE may monitor a first region by receiving a Reference Signal (RS) transmitted in common in the first region, measuring strength and/or interference of the received RS, and comparing the strength and/or interference of the RS with a predefined threshold. A value predefined in the system or determined by an eNB may be used as the threshold.

In an exemplary implementation, a UE receives an RS transmitted in common in a first region, measures channel quality of the first region based on strength and/or interference of the received RS, and transmits the measured channel quality information to an eNB, and the eNB allocates control information to the first region or the third region based on the channel quality information received from the UE. The UE then changes its operation mode according thereto. In addition, interference of a PDCCH, and Signal to Interference and Noise Ratio (SINR) or channel quality of a PDCCH may be used to monitor the first region. The interference may be determined in advance considering the possibility of receiving the PDCCH, or may be determined by an eNB or a UE.

The UE may measure at least one of strength and/or interference an RS, interference of a PDCCH, an SINR, and channel quality, and use it for monitoring the first region. In an exemplary embodiment of the present invention, an interference of a first region may be measured using a value obtained by subtracting a reception power of an RS from the entire power received in an Orthogonal Frequency Division Multiplexing (OFDM) symbol where the RS is transmitted. Various other known technologies may also be used to measure the interference of the first region.

In an exemplary embodiment of the present invention, if a UE periodically or aperiodically transmits to an eNB the result (monitoring result) measured by monitoring the first region, the eNB may determine whether to reconfigure a control channel by comparing the monitoring result with a predefined threshold. In the alternative, a UE may directly determine whether control channel reconfiguration is needed, by comparing the monitoring result for the first region with a predefined threshold. If the control channel reconfiguration is required, the UE requests the eNB to reconfigure the control channel.

If control channel reconfiguration from a first region to a third region is required because of the poor channel state of the first region, the UE may transmit a reporting message informing the eNB of the need for control channel reconfiguration, using a Physical Uplink Shared Channel (PUSCH) or a Physical Uplink Control Channel (PUCCH). Transmission of the reporting message over the PUSCH is achieved by higher layer signaling (Radio Resource Control (RRC)), while transmission of the reporting message over the PUCCH may be achieved using a Channel equality Indicator (CQI) channel or an ACK/NACK channel.

Exemplary embodiments of the present invention provide the following two implementations for control channel reconfiguration.

In a first exemplary implementation, if a UE reports the monitoring result for the first region to an eNB, the eNB determines whether to reconfigure a control channel by comparing the monitoring result with a threshold.

In a second exemplary implementation, a UE compares the monitoring result for the first region with a threshold received from an eNB, and if control channel reconfiguration is required, the UE requests the eNB to reconfigure the control channel.

Describing the first exemplary implementation, a UE measures channel quality of the first region and reports it to an eNB as a monitoring result for the first region. The monitoring result may be reported using a CQI channel of a PUSCH (RRC) or a PUCCH, and the eNB may allocate the control channel to a third region if it determines that control channel allocation (or control channel reconfiguration) to the third region is required, based on the monitoring result for the first region received from the UE. The eNB may inform the UE of the allocation of the control channel to the third region, using a PDSCH (RRC) or a PDCCH. The UE may then search both of the first region and the third region, or may search the third region after receiving from the eNB a message indicating the allocation of the control channel to the third region using the PDSCH (RRC) or PDCCH.

Describing the second exemplary implementation, a UE first receives a threshold for control channel reconfiguration from a broadcasting channel transmitted by an eNB. Instead of receiving the threshold from the broadcasting channel, the UE may use a threshold predefined between the UE and the eNB, or may receive a threshold through signaling with the eNB. The threshold, a reference value for determining channel quality of the first region, is a threshold at which the UE may receive a PDCCH. For example, the threshold may include strength and/or interference of an RS, interference of a PDCCH, an SINR, and a CQI.

In the second exemplary implementation, if a threshold determined by an eNB and at which the UE may receive a PDCCH is, for example, SINR=20 dB, the UE measures an SINR by measuring Received Signal Received Power (RSRP) and interference of the first region, sends the eNB a report (request) indicating a need for control channel allocation to the third region if the measured SINR is less than or equal to 20 dB, and sends no report (request) if the SINR measured in the first region is greater than or equal to 20 dB. As for the report by which the UE requests the eNB to reconfigure the control channel, the UE may transmit 1-bit indication information indicating the need for control channel reconfiguration, using an ACK/NACK channel of a PUSCH (RRC) or a PUCCH.

In a case where a UE transmits its report (request) through a CQI channel of a PUSCH or a PUCCH in the first or second exemplary implementation, the UE periodically or aperiodically reports the channel quality of the entire resource including the first region and the second region, or of resource of the first region, measures channel quality of resource of a second region, and compares the channel quality of the entire resource or the first region with the channel quality of the second region. If a difference between the channel qualities is greater than or equal to a specific threshold, the UE reports it to the eNB. Based on this channel quality report, the eNB may apply an adaptive link to each resource region. In this regard, the LTE-A standard has recently decided to introduce Channel State Information-RS (CSI-RS), for channel state measurement. Channel state measurement is possible based on the CSI-RS. Use of the CSI-RS facilitates channel state measurement on the second region, i.e., a region where data is transmitted in the system. In addition, when calculating a channel quality difference between the first region and the second region, the UE may calculate average values of interference and noise received at the two regions, and may report a difference between the average values.

Figure 5:
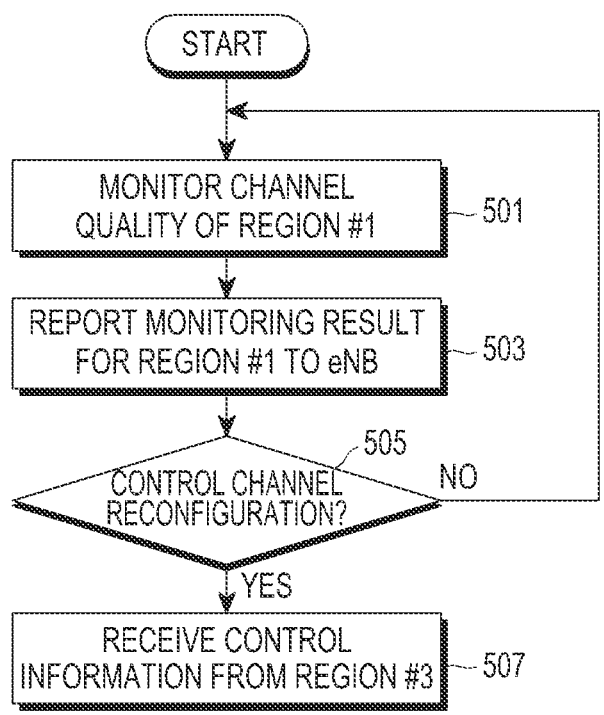
FIG. 5 is a flowchart illustrating a control channel reconfiguration method performed in a User Equipment (UE) according to an exemplary embodiment of the present invention.

FIG. 5 illustrates a control channel reconfiguration method performed in a UE according to an exemplary embodiment of the present invention.

Referring to FIG. 5, upon detecting control channel reconfiguration while receiving control information from a first region, a UE receives control information from a control channel in a third region.

In step 501, the UE periodically or aperiodically monitors channel quality of a first region. In step 503, the UE reports the monitoring result for the channel quality of the first region to an eNB periodically, aperiodically, or upon request of the eNB. In step 505, the UE waits for a response message to the report in step 503 to be received from the eNB and determines if a control channel has been reconfigured.

Therefore, if it is determined in step 505 that the control channel reconfiguration is indicated in the response message, the UE receives control information from the reconfigured control channel, i.e., a third region in step 507. As for the reconfigured control channel, a control channel in a predefined region may be used, or a control channel reconfigured by the response message may be indicated. In contrast, if it is determined in step 505 that the control channel reconfiguration is not indicated in the response message, or if no response message has been received from the eNB, the UE returns to step 501 and repeats its succeeding operation.

Figure 6:
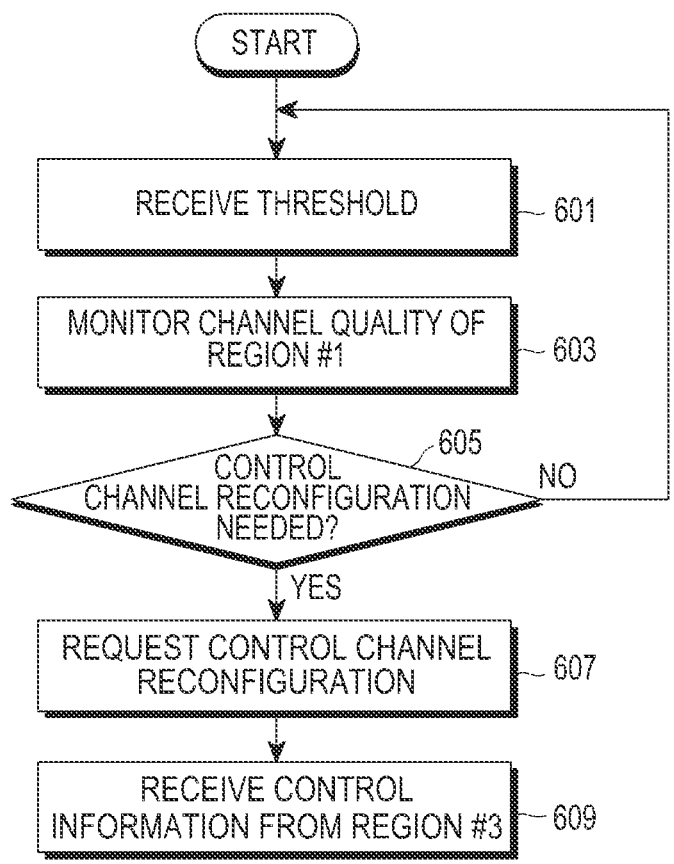
FIG. 6 is a flowchart illustrating a control channel reconfiguration method performed in a UE according to an exemplary embodiment of the present invention.

FIG. 6 illustrates a control channel reconfiguration method performed in a UE according to an exemplary embodiment of the present invention Referring to FIG. 6, upon detecting control channel reconfiguration while receiving control information from a first region, a UE receives control information from a control channel in a third region.

In step 601, the UE receives a threshold for control channel reconfiguration from an eNB. The threshold may be received over a broadcasting channel, or may be received through signaling with the eNB. In step 603, the UE periodically or aperiodically monitors channel quality of a first region. In step 605, the UE compares the monitoring result for the first region with the threshold received in step 601 and determines if control channel reconfiguration is needed, when the channel quality of the first region deviates from the threshold.

If it is determined in step 605 that the control channel reconfiguration is needed, the UE sends a message for reporting (requesting) control channel reconfiguration to the eNB in step 607. In step 609, the UE receives control information from the reconfigured control channel, i.e., a control channel in a third region. In contrast, if it is determined in step 605 that the control channel reconfiguration is not needed, the UE returns to step 601 and repeats its succeeding operation.

The exemplary embodiments of FIGS. 5 and 6 are different according to whether the control channel reconfiguration is determined by a UE or an eNB. In the alternative, the procedure of FIG. 5 may be performed if a threshold is not transmitted by the eNB in step 601, while the procedure of FIG. 6 may be performed if a threshold is transmitted by the eNB.

In the following description of exemplary embodiments, for convenience of description, an eNB will perform an operation according to the first exemplary implementation if there is no control channel reconfiguration request in a message for reporting (requesting) control channel reconfiguration, received from a UE, and the eNB will perform an operation according to the second exemplary implementation if there is a control channel reconfiguration request in the received message. However, it should be noted that the eNB does not necessarily require this procedure.

In other words, the control channel reconfiguration method may be modified in various forms, such as determining by an eNB whether control channel reconfiguration is needed according to the first exemplary implementation, determining by a UE whether control channel reconfiguration is needed according to the second exemplary implementation, and selectively performing one of the first and second exemplary implementations according to whether a threshold is transmitted by the eNB.

Figure 7:
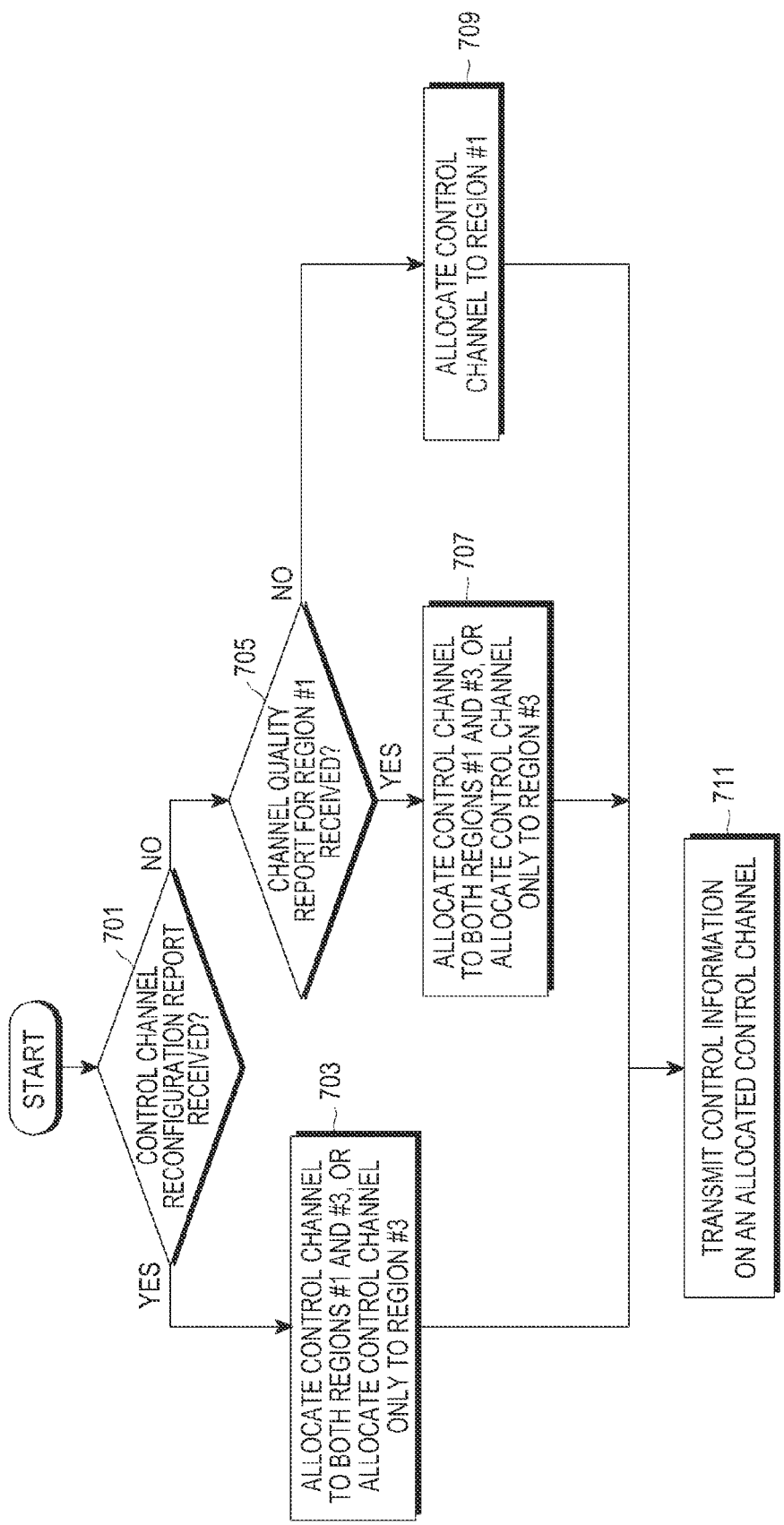
FIG. 7 is a flowchart illustrating an operation of an evolved Node B (eNB) when the eNB receives a report requesting control channel reconfiguration from a UE according to an exemplary embodiment of the present invention.

FIG. 7 illustrates an operation of an eNB when the eNB receives a report requesting control channel reconfiguration from a UE according to an exemplary embodiment of the present invention.

Referring to FIG. 7, an eNB determines in step 701 whether a report requesting control channel reconfiguration is received from a UE. If it is determined in step 701 that a report requesting control channel reconfiguration is received from a UE, according to the second exemplary implementation, the eNB reconfigures a control channel in a third region in step 703. In an intermediate process, the eNB may configure a control channel carrying the same control information in both a first region and a third region. This is because the UE may not determine that control information is transmitted in the third region, before it receives from the eNB a response message indicating that the control channel has been reconfigured in the third region.

In contrast, if it is determined in step 701 that no control channel reconfiguration request is received from the UE, the eNB determines in step 705 whether a channel quality report for the first region is received, according to the first exemplary implementation. If it is determined in step 705 that channel quality report for the first region is received, the eNB reconfigures a control channel in the third region in step 707. In an intermediate process, the eNB may configure a control channel carrying the same control information in both the first region and the third region. The reason is the same as described in step 703. In contrast, if it is determined in step 705 that the channel quality report for the first region is not received, the eNB maintains the control channel allocated in the first region in step 709.

In step 711, the eNB transmits control information through the control channel reconfigured in the related region(s) in steps 703, 707 and 709.

Although not illustrated in FIG. 7, when allocating the control channel in the third region, the eNB may send to the UE a response message indicating that the control channel has been reconfigured in the third region. The response message is sent to the UE over a PDSCH (RRC) or a PDCCH.

Figure 8:
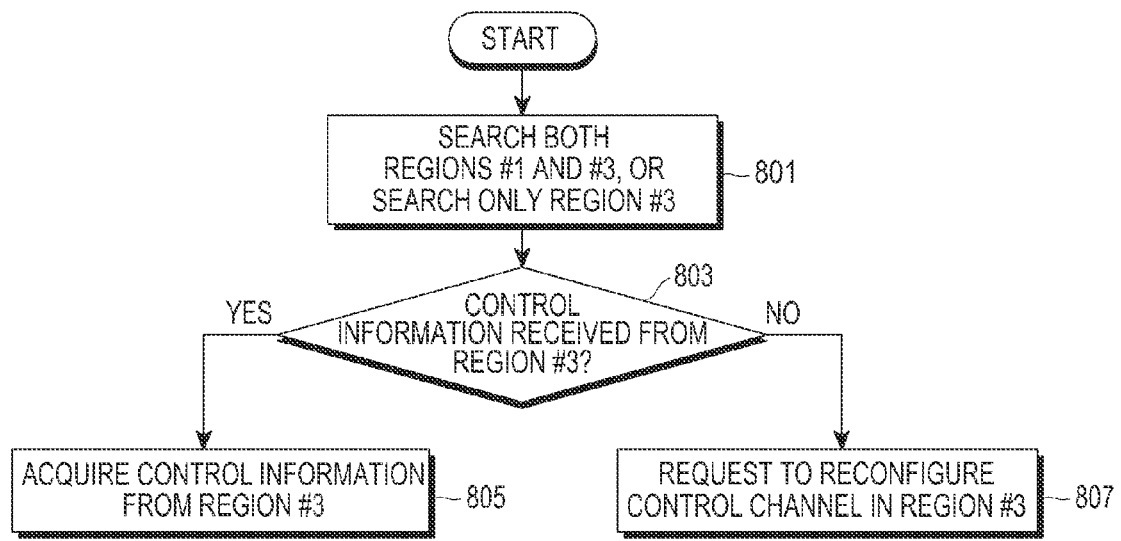
FIG. 8 is a flowchart illustrating an operation of a UE receiving control information over a reconfigured control channel according to an exemplary embodiment of the present invention.

FIG. 8 illustrates an operation of a UE receiving control information over a reconfigured control channel according to an exemplary embodiment of the present invention.

Referring to FIG. 8, in step 801, a UE reports to an eNB of a need for control channel reconfiguration in a third region, and then searches both the first and third regions or searches only the third region. The UE searches both the first and third regions because the UE may not determine that control information is transmitted in the third region, before it receives from the eNB a response message indicating that the control channel has been reconfigured in the third channel. In step 803, the UE determines whether control information is received from the third region. Step 803 may be replaced by an operation of determining by the UE whether a response message indicating control channel reconfiguration has been received from the eNB.

In other words, although the UE may search only in the third region after sending a request for control channel reconfiguration to the eNB, according to the second exemplary implementation, the UE may perform search on both the first region and the third region in an intermediate process to guarantee stable reception of the control information because the control information is transmitted from the first region before the control channel reconfiguration is actually completed.

If it is determined in step 803 that control information is received from the third region, the UE acquires the control information transmitted from the third region in step 805. In contrast, if it is determined in step 803 that no control information is received from the third region for a predefined time, the UE sends in step 807 a report requesting control channel reconfiguration to the eNB, as done in step 607 of FIG. 6. The reporting in step 807 may be repeated periodically or aperiodically.

By applying the control channel reconfiguration, in the scenario where a UE cannot receive control information from the first region due to an instantaneous increase in interference in the first region, the UE may seamlessly receive the control information using the control channel reconfigured in the third region in the heterogeneous network environment including pico cells and femto cells.

However, in the first and second exemplary implementations, the UE may not identify the reconfiguration of the control channel before it receives a message indicating the control channel reconfiguration from the eNB, even though the eNB reconfigures the control channel and transmits control information through the reconfigured control channel.

Therefore, an exemplary embodiment of the present invention proposes a method in which, upon receiving from a UE a channel quality report according to the first exemplary implementation or a report requesting control channel reconfiguration according to the second exemplary implementation, an eNB sends a message indicating control channel reconfiguration to the UE and then transmits the same control information not only in the third region but also in the first region in an intermediate process before it receives a confirmation message from the UE, instead of immediately stopping the transmission of the control information in the existing PDCCH region (i.e., the first region) and transmitting the control information only with the new PDCCH (i.e., the third region). In this case, the UE may stably receive the control information, minimizing the procedure that is required by the UE and the eNB in the system of the related art.

Figure 9:
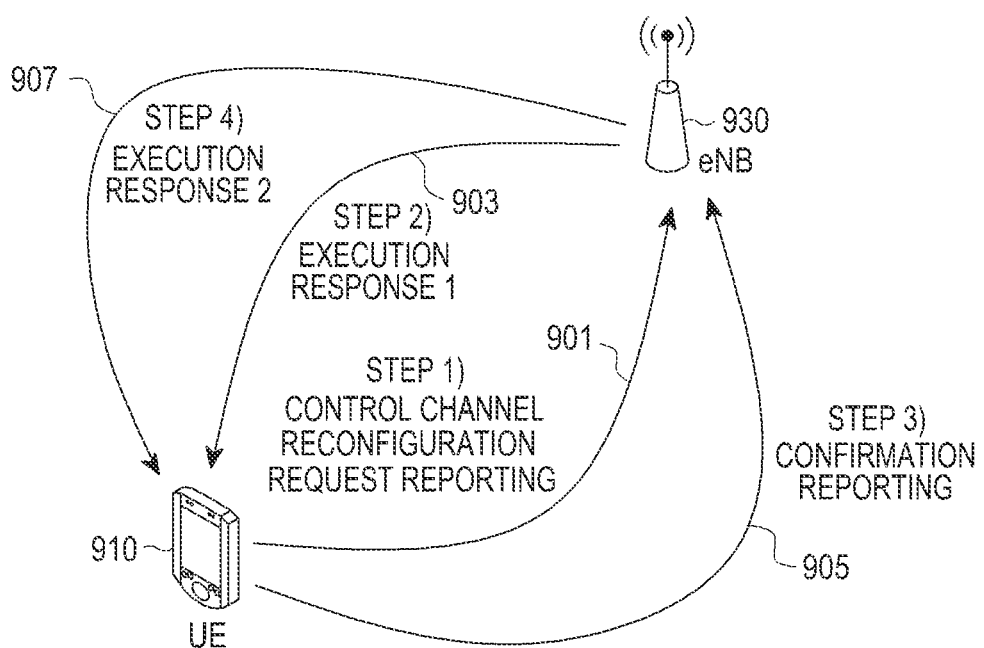
FIG. 9 is a diagram illustrating a signaling procedure between a UE and an eNB for control channel reconfiguration according to an exemplary embodiment of the present invention.

FIG. 9 illustrates a signaling procedure between a UE and an eNB for control channel reconfiguration according to an exemplary embodiment of the present invention.

A UE may send a request for control channel reconfiguration to an eNB. Messages exchanged between a UE and an eNB will first be described.

1) Control channel reconfiguration request reporting is a report message with which a UE informs an eNB of a need for control channel allocation to a third region. This message may be sent over a PUSCH or a PUCCH (with CQI or ACK/NACK).

2) Execution response 1 (or first response message) is a response message with which an eNB informs a UE of its allocating a control channel to a third region, after receiving the control channel reconfiguration request reporting from the UE, and this message may be sent over a PDSCH (RRC). The eNB may transmit the same control information not only in the third region but also in the first region.

3) Confirmation reporting (or confirmation message) is a message with which a UE having received the execution response 1 informs an eNB of its receiving (acquiring) control information from a third region. This message may be sent over a PUSCH (RRC) or PUCCH (ACK/NACK).

4) Execution response 2 (or second response message) is a message with which an eNB informs a UE of its allocating a control channel only to a third region, after receiving the confirmation reporting from the UE. This message may be sent over a PDSCH (RRC). The eNB transmits control information only through the third region, stopping the transmission of control information through the first region.

Operations of a UE and an eNB, which perform control channel reconfiguration by exchanging the above messages, will be described with reference to FIG. 9.

<Step 1>

Referring to FIG. 9, in step 901, if a UE 910 monitoring a first region determines that it should receive control information not from the first region but from a new control channel region (i.e., a third region) due to the interference, the UE 910 sends to eNB 930 a control channel reconfiguration request reporting indicating the need to allocate a control channel to the third region.

<Step 2>

A description will be made as to an operation of the eNB after the UE sends the control channel reconfiguration request reporting in step 901. Upon receiving the request reporting from the UE, the eNB allocates the same control information to both the first region and the third region, for its transmission. By sending an execution response 1 to the UE in step 903, the eNB informs the UE of its transmitting the control information in both the first region and the third region.

During control information allocation, the eNB may allocate the control information not with all aggregation levels but with specific aggregation levels, in order to prevent blind decoding from increasing in number when the UE searches both the first region and the third region.

In an exemplary embodiment of the present invention, a method of allocating a control channel with specific aggregation levels will be described with reference to an LTE system. Table 1 below shows the general PDCCH search space in the LTE system.

TABLE 1

| Search space | | | |
|---|---|---|---|
| Type | Aggregation Level [CCEs] | Size of search space [in CCEs] | Number of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

It can be understood from Table 1 that the PDCCH search space is divided into a UE-specific search space and a common search space, and a total of 22 blind decodings are required for all of aggregation levels 1, 2, 4 and 8. The LTE system requires a total of 44 blind decodings because it has 2 coding rates for each region.

Therefore, if the UE searches both the first region and the third region in an uncertain period of the PDCCH reconfiguration process, the UE should undesirably perform a total of 88 blind decodings, which is twice the number, 44, of blind decodings of the LTE UE.

However, in limiting the PDCCH search region to specific aggregation levels, upon receiving the control channel reconfiguration request reporting from the UE in step 901, the eNB transmits the same control information in both the first region and the third region, limiting them to specific aggregation levels. For example, if control information is transmitted in the first region and the third region, as shown in Table 2 below, the total number of blind decodings of the UE is 40 (20 for the first region, and 20 for the third region), which is not greater than the existing number of blind decodings. Table 2 shows an example of a PDCCH search space with specific aggregation levels, which are not limited to the details given in Table 2.

TABLE 2

| Search space | | | |
|---|---|---|---|
| Type | Aggregation Level [CCEs] | Size of search space [in CCEs] | Number of PDCCH candidates |
| UE-specific | 4 | 8 | 2 |
| | 8 | 16 | 2 |
| Common | 4 | 16 | 4 |
| | 8 | 16 | 2 |

An exemplary embodiment of the present invention proposes two different exemplary implementations of selecting specific aggregation levels. In an exemplary implementation, a UE and an eNB use only the predefined aggregation levels. In an exemplary implementation, when sending the control channel reconfiguration request reporting to the eNB in step 901, the UE determines specific aggregation levels and transmits information about them, and the eNB transmits control information with the aggregation levels, information of which was received from the UE, so the UE may perform blind decoding only with the specific aggregation levels.

In step 903, the eNB may send an execution response 1 indicating that it has allocated control information to both the first region and the third region, to the UE through high layer signaling (RRC).

Figure 10:
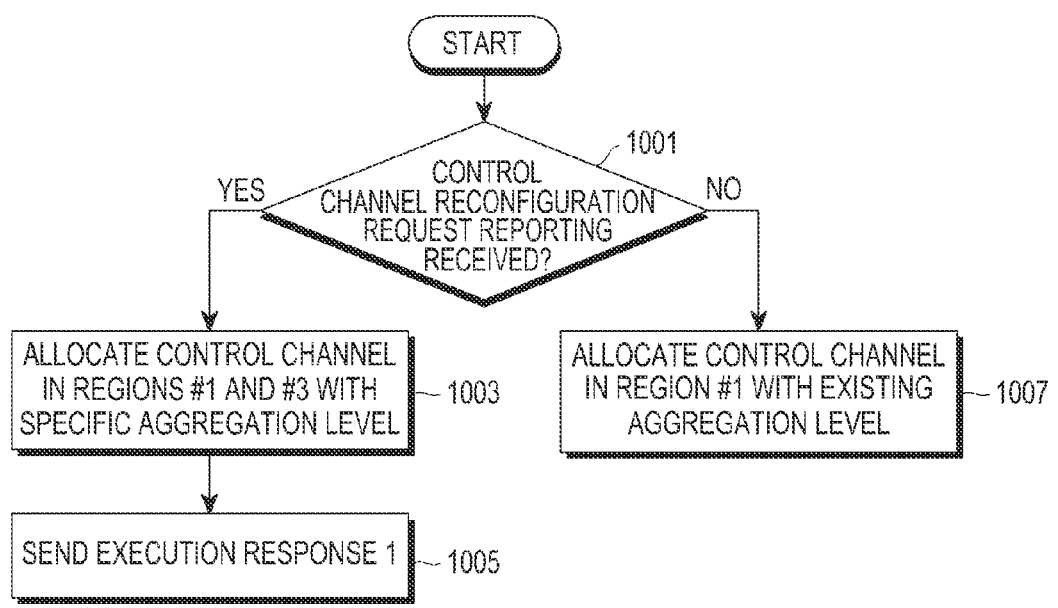
FIG. 10 is a flowchart illustrating an operation of an eNB when the eNB receives a control channel reconfiguration request reporting from a UE according to an exemplary embodiment of the present invention.

FIG. 10 illustrates an operation of an eNB when the eNB receives a control channel reconfiguration request reporting from a UE according to an exemplary embodiment of the present invention.

Referring to FIG. 10, an eNB determines in step 1001 whether a control channel reconfiguration request reporting is received from the UE. If it is determined in step 1001 that the control channel reconfiguration request reporting is received from the UE, the eNB allocates a control channel having specific aggregation levels in the first region and the third region in step 1003, and sends to the UE an execution response 1 indicating its allocating a control channel to both the first region and the third region in step 1005. In contrast, if it is determined in step 1001 that the control channel reconfiguration request reporting is not received from the UE, the eNB maintains the control channel having the existing aggregation levels in the first region in step 1007.

Figure 11:
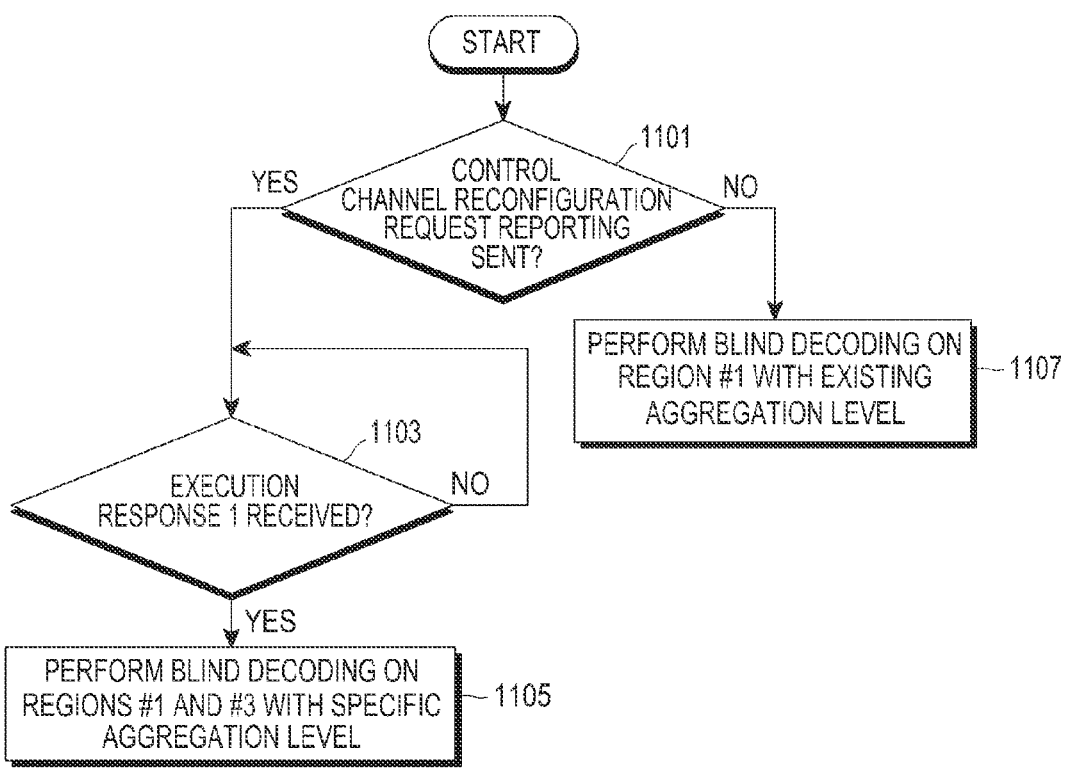
FIG. 11 is a flowchart illustrating an operation of a UE when an eNB transmits control information with specific aggregation levels in a first region and a third region according to an exemplary embodiment of the present invention.

FIG. 11 illustrates an operation of a UE when an eNB transmits control information with specific aggregation levels in a first region and a third region according to an exemplary embodiment of the present invention.

Referring to FIG. 11, if it is determined in step 1101 that a UE sent a control channel reconfiguration request reporting to an eNB, the UE determines in step 1103 whether the execution response 1 described in step 903 is received. Determining whether the execution response 1 is received may be performed for a predefined waiting time after the UE sent the control channel reconfiguration request reporting. The execution response 1 may be sent through, for example, high layer signaling (RRC). If it is determined in step 1103 that the execution response 1 is received, the UE performs independent blind decoding in the first region and the third region with specific aggregation levels in step 1105. In contrast, if it is determined in step 1101 that no control channel reconfiguration request reporting is received, the UE performs blind decoding on the first region with the existing aggregation levels in step 1107.

<Step 3>

If the UE having received the execution response 1 from the eNB, has decoded control information in both the first region and the third region, or has decoded control information only in the third region, the UE sends a confirmation reporting indicating its receiving the control information for the third region from the reconfigured control channel, to the eNB through high layer signaling (RRC), as down in step 905.

Figure 12:
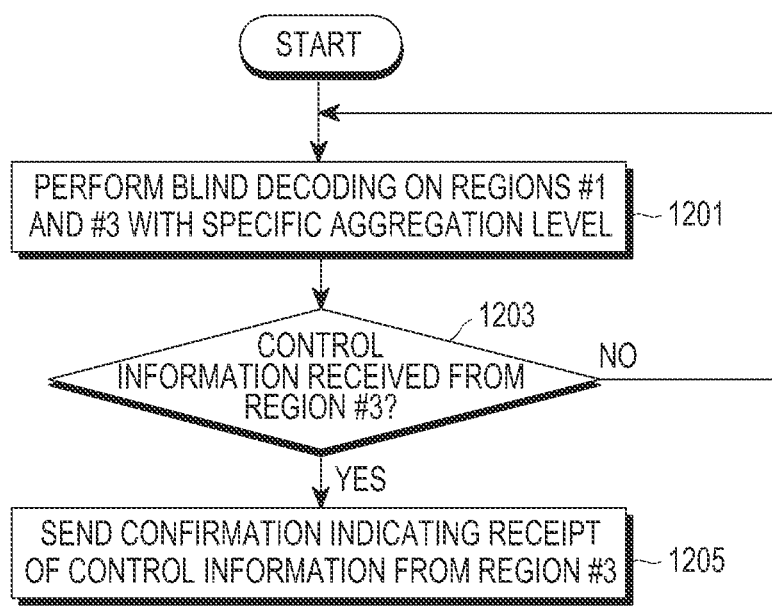
FIG. 12 is a flowchart illustrating an operation of sending a confirmation reporting to an eNB by a UE having received control information from a third region according to an exemplary embodiment of the present invention.

FIG. 12 illustrates an operation of sending a confirmation reporting to an eNB by a UE having received control information from a third region according to an exemplary embodiment of the present invention.

Referring to FIG. 12, upon receiving an execution response 1 from an eNB, a UE performs blind decoding in both the first region and the third region or in the third region with specific aggregation levels in step 1201. Upon receiving control information corresponding to the decoding result for the third region in step 1203, the UE sends to the eNB a confirmation reporting indicating the receipt of the control information from the third region in step 1205.

<Step 4>

Figure 13:
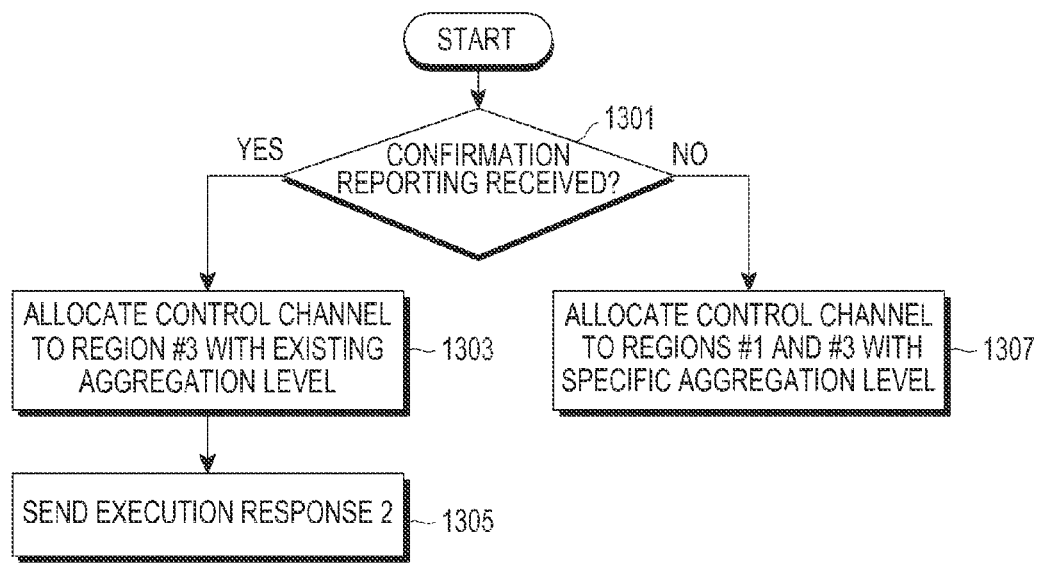
FIG. 13 is a flowchart illustrating an operation of an eNB having received a confirmation reporting from a UE according to an exemplary embodiment of the present invention.

FIG. 13 illustrates an operation of an eNB having received a confirmation reporting from a UE according to an exemplary embodiment of the present invention.

Referring to FIG. 13, if a UE having received control information from the third region sends a confirmation reporting to the eNB in FIG. 9 and the eNB receives the confirmation reporting from the UE in step 1301, then the eNB allocates a control channel only to the third region in step 1303, without allocating the control channel to the first region. In this case, as for the aggregation levels for the control information allocated to the third region, the existing aggregation levels as shown in Table 1 are used intact. In step 1305, the eNB sends an execution response 2 indicating its allocating control information only in the new DPCCH region, to the UE through high layer signaling (RRC).

Upon failure to receive the confirmation reporting from the UE in step 1301, the eNB allocates a control channel to the first region and the third region with specific aggregation levels in step 1307, to transmit control information.

An operation of a UE performed when an eNB allocates control information only to the new PDCCH region (i.e., third region) will now be described.

Figure 14:
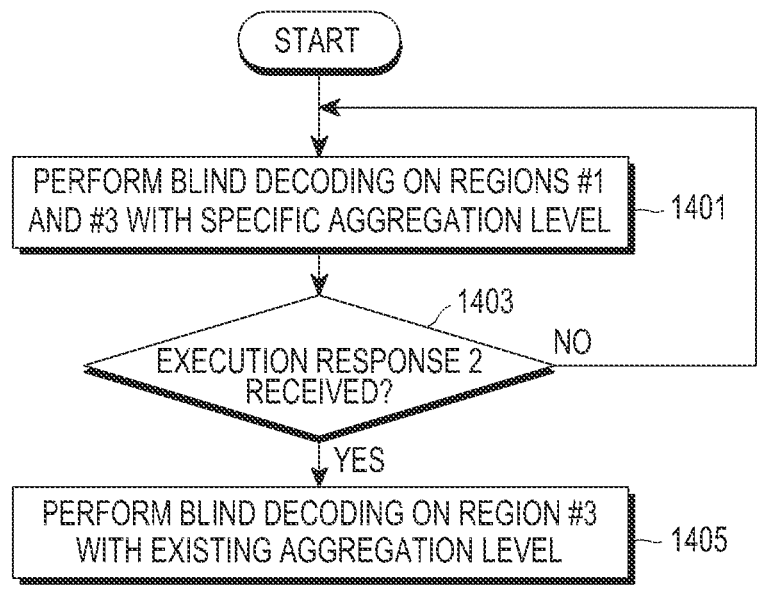
FIG. 14 is a flowchart illustrating an operation of a UE having received an execution response 2 from an eNB according to an exemplary embodiment of the present invention.

FIG. 14 illustrates an operation of a UE having received an execution response 2 from an eNB according to an exemplary embodiment of the present invention.

Referring to FIG. 14, a UE, which has sent a confirmation reporting after receiving an execution response 1 from the eNB, performs blind decoding on both the first region and the third region or on the third region with specific aggregation levels in step 1401. If it is determined in step 1403 that an execution response 2 indicating its allocating control information only to the third region is received from the eNB, the UE performs blind decoding on the third region with the existing aggregation levels in step 1405, and the number of blind decodings performed may be, for example, 44, as in the method of the related art. In contrast, if it is determined in step 1403 that the execution response 2 is not received, the UE performs blind decoding on both the first region and the third region or on the third region with specific aggregation levels as in step 1401.

Through the process of <step 1> to <step 4> in FIG. 9, the control channel reconfiguration may be performed stably. Control channel reconfiguration from a third region to a first region may also be performed in the same way. The control channel may be reconfigured from the third region to the first region when it is determined that even though the third region has good channel quality, the first region has channel quality higher than or equal to a threshold and thus can receive control information.

Figure 15:
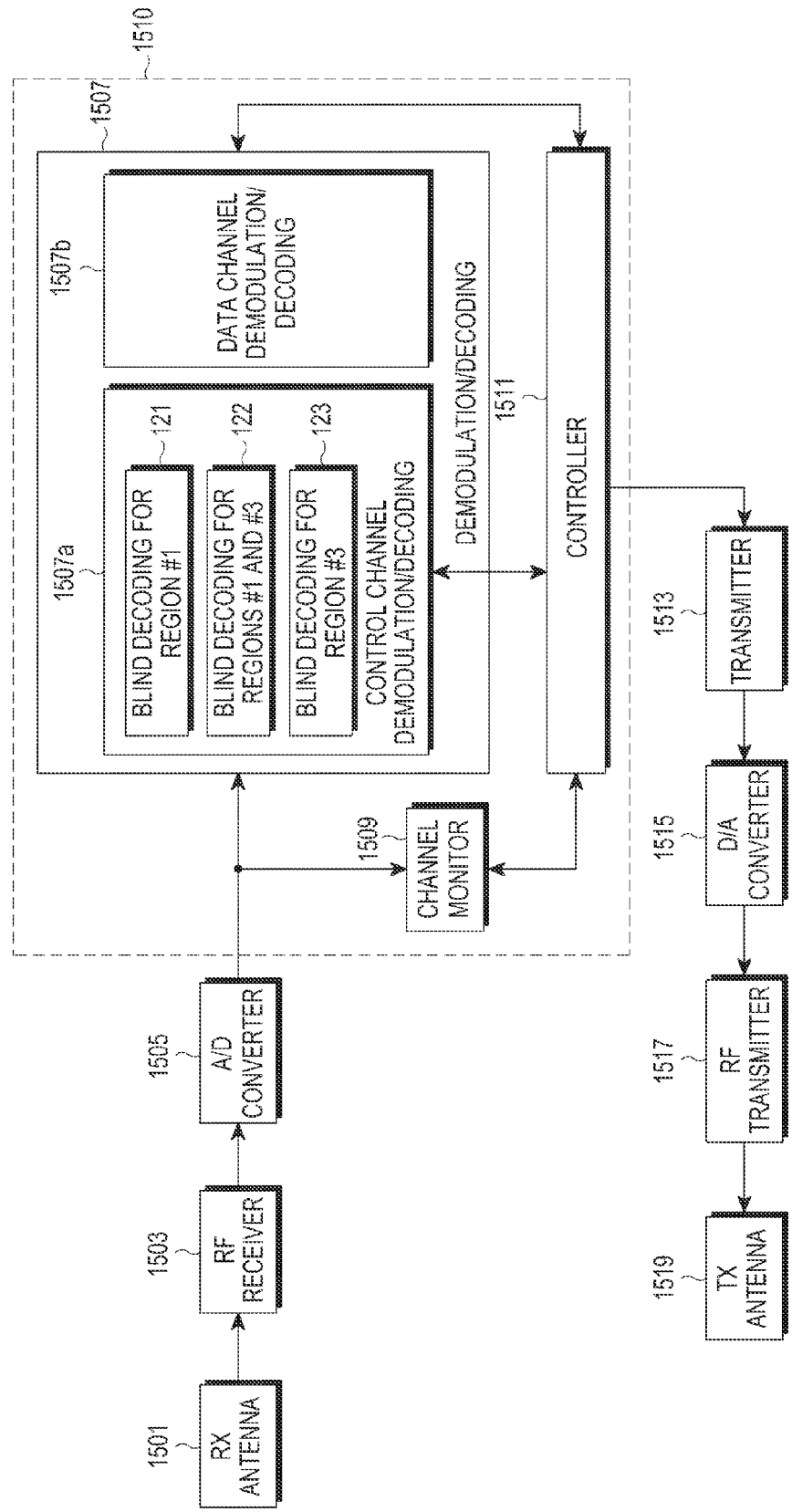
FIG. 15 is a block diagram illustrating a structure of a UE performing control channel reconfiguration according to an exemplary embodiment of the present invention.

FIG. 15 illustrates a structure of a UE performing control channel reconfiguration according to an exemplary embodiment of the present invention.

Referring to FIG. 15, a UE converts a signal received through an antenna 1501 into a baseband or low-frequency band analog signal in a Radio Frequency (RF) receiver 1503. An output of the RF receiver 1503 is converted into a digital signal by an Analog-to-Digital (A/D) converter 1505. The converted digital signal is demodulated by a baseband receiver 1510. The baseband receiver 1510 includes a demodulation/decoding unit 1507, a channel monitor 1509, and a controller 1511. The demodulation/decoding unit 1507 includes a control channel demodulation/decoding unit 1507a, and a data channel demodulation/decoding unit 1507b.

In the baseband receiver 1510, the demodulation/decoding unit 1507 demodulates and decodes received control channel and data channel based on the received baseband signal. The control channel demodulation/decoding unit 1507a, under control of the controller 1511, performs control channel decoding, including blind decoding D1 (121) for a first region, blind decoding D3 (123) for a third region, and blind decoding D2 (122) for the first and third regions.

The channel monitor 1509 monitors channel quality of the first region under control of the controller 1511, and provides the monitoring result to the controller 1511. The channel quality may include interference of the first region. The channel monitor 1509 may be included in the controller 1511. The received signal demodulated and decoded on the data channel is transferred to the controller 1511. The controller 1511 triggers the control channel demodulation/decoding unit 1507a in response to an execution response 1 or an execution response 2 from an eNB as in FIG. 9. In regard to the control channel, the controller 1511 generates uplink feedback information to carry a configuration reporting to the eNB according to whether the control channel demodulation/decoding unit 1507a decodes the third region in the blind decoding process for the first region and/or third region. For uplink transmission of the feedback information, a transmitter 1513 performs encoding and modulation, and performs necessary baseband signal processing. The generated uplink transmission signal is converted into an analog signal in a Digital-to-Analog (D/A) converter 1515. The analog transmission signal is converted into a signal with a desired frequency and amplified in an RF transmitter 1517, and then transmitted as a radio signal through an antenna 1519.

The controller 1511 performs the overall control operation, including monitoring channel quality of the first region by the proposed control channel reconfiguration methods described with reference to FIGS. 5 through 14, and receiving control information from the third region by sending and receiving various messages described with reference to FIG. 9.

Figure 16:
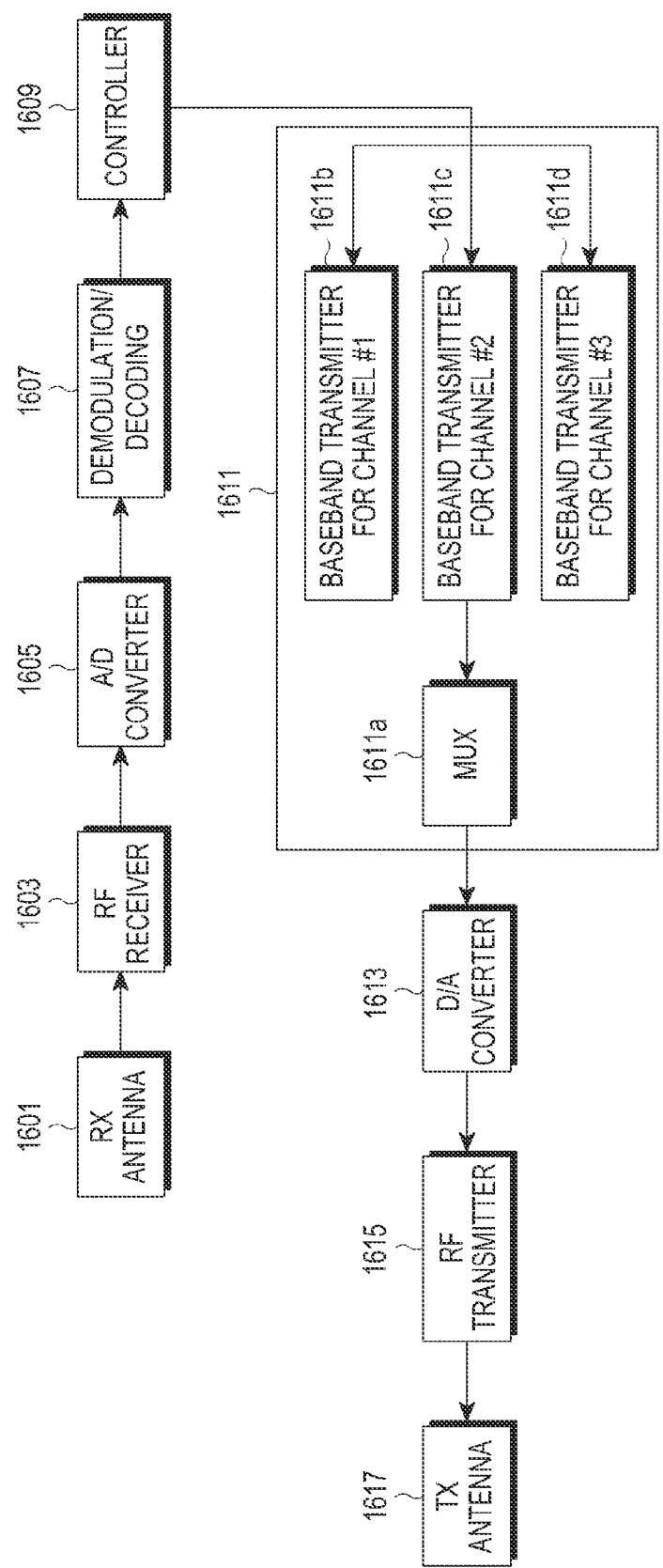
FIG. 16 is a block diagram illustrating a structure of an eNB performing control channel reconfiguration according to an exemplary embodiment of the present invention.

FIG. 16 illustrates a structure of an eNB performing control channel reconfiguration according to an exemplary embodiment of the present invention.

Referring to FIG. 16, an eNB receives an uplink transmission signal at an antenna 1601. The received signal is converted into a signal of a baseband or a low frequency close to the baseband in an RF receiver 1603. This signal is converted into a digital signal in an A/D converter 1605. The received digital signal undergoes demodulation and decoding in a demodulation/decoding unit 1607, so that the transmitted control channel and data channel information are extracted. The control and data information is provided to a controller 1609. The control channel information the eNB receives may be information transmitted in, for example, a PUCCH, and the data channel information the eNB receives may be information transmitted over, for example, a PUSCH. The messages sent to an eNB by a UE in FIG. 9, such as a request reporting in step 901 and a confirmation reporting in step 905, are control information transmitted to the eNB by the UE, and this control information may be transmitted over a PUCCH or a PUSCH (RRC).

Based on this control information, the controller 1609 determines whether it will allocate a control channel for a UE to a first region, a third region, or both the first and third regions, and also determines the specific aggregation levels. Downlink channels including the control channel determined by the controller 1609 are input to a baseband transmitter 1611.

The baseband transmitter 1611 includes a first-channel baseband transmitter 1611b, a second-channel baseband transmitter 1611c, a third-channel baseband transmitter 1611d, and a multiplexer (MUX) 1611a. The first-channel baseband transmitter 1611b generates a baseband signal of a channel transmitted in the first region, and the second-channel baseband transmitter 1611c generates a baseband signal of a channel transmitted in the second region. The third-channel baseband transmitter 1611d generates a baseband signal of a channel transmitted in the third region. The first channel and the third channel may be control information channels transmitted in the first region and the third region, respectively, while the second channel may be a data channel transmitted in the second region. The execution response 1 and the execution response 2 that the eNB transmits to the UE during control channel reconfiguration according to the procedure of FIG. 9, may be transmitted over the second channel.

The baseband transmission signals for the first, second and third channels are multiplexed in the MUX 1611a. The multiplexed signal is converted into an analog signal in a D/A converter 1613, and this analog signal is converted again into a signal of a desired band in an RF transmitter 1615 and then transmitted on a downlink through an antenna 1617.

The controller 1609 performs control channel reconfiguration from the first region to the third region upon receiving channel quality of the first region or a control channel reconfiguration request reporting from the UE according to the proposed control channel reconfiguration methods described with reference to FIGS. 5 through 14. In addition, the controller 1609 may perform the overall control operation, including reconfiguring a control channel in the third region by sending and receiving various messages described with reference to FIG. 9, and transmitting control information to the UE through the control channel reconfigured in the third region.

As is apparent from the foregoing description, according to exemplary embodiments of the present invention, control channel reconfiguration may be efficiently performed considering the interference between heterogeneous cells or between homogeneous cells in a wireless communication system. In addition, additional operations between a UE and an eNB may be minimized during control channel reconfiguration, enabling efficient operations of the eNB and the UE.

According to exemplary embodiments of the present invention, there is provided a UE procedure in which the UE decodes a new control channel (e.g., an E-PDCCH in a heterogeneous network, and a PDCCH of another CC in carrier aggregation) allocated from an eNB.

According to exemplary embodiments of the present invention, there is provided a method in which in a control channel reconfiguration process, a UE may perform blind decoding if it is unclear whether control information is transmitted in the existing control channel region or a new control channel region.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving control information by a User Equipment (UE) in a wireless communication system, the method comprising:
    monitoring, by the UE, channel quality of a control channel;
    determining, by the UE, whether reconfiguration of the control channel is required, based on the channel quality of the control channel;
    requesting, by the UE, if the reconfiguration of the control channel is required, an evolved Node B (eNB) to reconfigure the control channel;
    receiving, from the NB, a response message to the request to reconfigure the control channel;
    transmitting a confirmation message for the response message to the eNB, and receiving, by the UE, the control information through the reconfigured control channel by performing blind decoding on the reconfigured control channel using an existing aggregation level.

2. The method of claim 1, wherein the reconfigured control channel is allocated to a region of an extended control channel in a data channel.

3. The method of claim 1, wherein the reconfigured control channel is allocated to another Carrier Component (CC) in carrier aggregation.

4. The method of claim 1, wherein the performing of the blind decoding comprises performing blind decoding on the reconfigured control channel using a specific aggregation level.

5. The method of claim 1, further comprising:
receiving, upon receiving the response message to the confirmation message from the eNB, the control information through the reconfigured control channel.

6. The method of claim 1, further comprising:
receiving from the eNB a threshold for reconfiguring the control channel; and
determining whether reconfiguration of the control channel is required, by comparing the channel quality with the threshold.

7. A User Equipment (UE) for receiving control information in a wireless communication system, the UE comprising:
a transmission/reception unit configured to:
receive control information from an evolved Node B (eNB), and
transmit and receive a message associated with reconfiguration of a control channel carrying the control information; and
a controller configured to:
monitor channel quality of the control channel,
determine whether reconfiguration of the control channel is required, based on the channel quality of the control channel,
request the eNB to reconfigure the control channel if the reconfiguration of the control channel is required,
receive, from the eNB, a response message to the request to reconfigure the control channel,
transmit a confirmation message for the response message to the eNB, and
receive the control information through the reconfigured control channel by performing blind decoding on the reconfigured control channel using an existing aggregation level.

8. The UE of claim 7, wherein the reconfigured control channel is allocated to a region of an extended control channel in a data channel.

9. The UE of claim 7, wherein the reconfigured control channel is allocated to another Carrier Component (CC) in carrier aggregation.

10. The UE of claim 7, wherein the controller is further configured to perform the blind decoding on the reconfigured control channel using a specific aggregation level.

11. The UE of claim 7, wherein, upon the receiving of the response message to the confirmation message from the eNB, the controller is further configured to receive the control information through the reconfigured control channel.

12. The UE of claim 7, wherein the controller is further configured to:
receive, from the eNB, a threshold for reconfiguring the control channel, and
determine whether reconfiguration of the control channel is required, by comparing the channel quality with the threshold.

13. A method for transmitting control information by an evolved Node B (eNB) in a wireless communication system, the method comprising:
determining, by the eNB, whether a message for requesting reconfiguration of a control channel has been received from a User Equipment (UE);
transmitting, to the UE, a response message upon receiving the message for requesting reconfiguration of the control channel;
receiving, from the UE, a confirmation message for the response message;
allocating, by the eNB, upon receiving the message, a reconfigured control channel to a region of an extended control channel in a data channel; and
transmitting, by the eNB, the control information through the reconfigured control channel.

14. The method of claim 13, wherein the reconfigured control channel is allocated to another Carrier Component (CC) in carrier aggregation.

15. The method of claim 13, wherein the allocating of the reconfigured control channel comprises allocating the reconfigured control channel using a specific aggregation level.

16. The method of claim 13, further comprising:
allocating, upon receiving the message requesting reconfiguration of the control channel, the reconfigured control channel using a specific aggregation level; and
allocating, upon receiving the confirmation message for the first response message, the reconfigured control channel using an existing aggregation level.

17. An evolved Node B (eNB) for transmitting control information in a wireless communication system, the eNB comprising:
a transmission/reception unit configured to
transmit control information to a User Equipment (UE), and
transmit and receive a message associated with reconfiguration of a control channel carrying the control information; and
a controller configured to:
determine whether a message requesting reconfiguration of the control channel has been received from the UE,
transmit, to the UE, a response message upon receiving the message for requesting reconfiguration of the control channel,
receive, from the UE, a confirmation message for the response message,
allocate a reconfigured control channel to a region of an extended control channel in a data channel upon receiving the message, and
transmit the control information through the reconfigured control channel.

18. The eNB of claim 17, wherein the controller is further configured to allocate the reconfigured control channel to another Carrier Component (CC) in carrier aggregation.

19. The eNB of claim 17, wherein the controller is further configured to allocate the reconfigured control channel using a specific aggregation level.

20. The eNB of claim 17, wherein the controller is further configured to:
allocate the reconfigured control channel using a specific aggregation level upon receiving the message requesting reconfiguration of the control channel, and
allocate the reconfigured control channel using an existing aggregation level upon receiving a confirmation message for the first response message.

* * * * *